United States Patent [19]

Fort

[11] 3,764,943

[45] Oct. 9, 1973

[54] FILTER CONTACT FOR AN ELECTRICAL CONNECTOR

[75] Inventor: Jack B. Fort, Sidney, N.Y.

[73] Assignee: The Bendix Corporation, Southfield, Mich.

[22] Filed: May 22, 1972

[21] Appl. No.: 255,371

[52] U.S. Cl. .......... 333/79, 333/31, 339/147

[51] Int. Cl. .......... H01h 7/14

[58] Field of Search .......... 333/79, 31; 339/147, 339/147 C, 121

[56] References Cited

UNITED STATES PATENTS

| | | | |
|---|---|---|---|
| 3,588,758 | 6/1971 | Hurst | 333/79 |
| 3,219,950 | 11/1965 | Brueckmann | 333/31 R |
| 3,579,155 | 5/1971 | Mills | 333/79 |
| 3,541,473 | 11/1970 | Schlicke et al. | 333/79 X |
| 3,617,958 | 11/1971 | Schor | 333/79 |
| 3,535,676 | 10/1970 | Schultz, Sr. | 333/79 |
| 3,324,426 | 6/1967 | Brueckmann | 333/79 |

*Primary Examiner*—Rudolph V. Rolinec
*Assistant Examiner*—Saxfield Chatmon, Jr.
*Attorney*—Raymond J. Eifler et al.

[57] ABSTRACT

An electrical connector assembly having one or more filter contacts therein for eliminating undesired high frequency currents. The filter contacts are designed so that rated currents can be applied without degradation of the attentuation performance due to saturation of the inductive element of the filter.

13 Claims, 6 Drawing Figures

FILTER CONTACT FOR AN ELECTRICAL CONNECTOR

BACKGROUND OF THE INVENTION

This invention relates to electrical connectors of the type having contacts that have capacitive and inductive components arranged to filter out predetermined frequencies. This invention is more particularly related to an improved filter contact that operates over a rated current range without degradation in the filter attenuation performance.

In television and other electronic circuits utilizing high frequencies, portions of the circuits radiate electrical energy and thereby induce undesired high frequency currents in circuit leads intended for carrying low frequency and direct current signals. A common method for disposing of the undesired signals is to channel the leads through a shielding wall. Encircling and intermediate the leads and shields are low reactance filters electrically connected between the leads and the shields. The filters serve as high impedance paths to the low frequency and direct current signals and low impedance paths to the high frequency signals. Thus, the desired signals pass along the leads to the external circuitry and the undesired signals are bypassed to the shields.

Examples of electrical connectors of the type having one or more r-f filter assemblies that generally include a capacitor and inductor element may be found in the following patents that relate to filter connector assemblies and the filter contacts themselves: Pat. No. 3,435,387 entitled "Solderless Mounting Filter Connection", issued to J. F. Reinke et al. Mar. 25, 1969, which describes a feed-through connector assembly; Pat. No. 3,588,758 entitled "Electrical Connector Filter Having Dielectric and Ferromagnetic Tubes Bonded Together with Conductive Electrode Layers and Having Nonintegral Connecting Spring", issued to D. J. Hurst June 28, 1971, which relates to an electrical connector contact filter assembly; and Pat. No. 3,462,715 entitled "Removable Electrical Connector Filter Assembly", issued to F. W. Schor Aug. 19, 1969, which describes the components and assembly of an electrical connector contact and its associated filter circuitry.

One ever-present problem with filter connectors is that when the current flowing through the conductor increases, the attenuation of the filter decreases, which is undesirable. For example, in existing filter connectors the typical attenuation performance of the filter contact drops off at least 10 decibels when a d-c or low frequency current through the contact is increased from 0 to 7.5 amps.

SUMMARY OF THE INVENTION

This invention provides the filter contact for an electrical connector assembly whose attenuation does not fall off adversely for a corresponding increase in current flowing through the contact.

The invention is a filter contact assembly for an electrical connector characterized by the inductive portion of the filter assembly being comprised of the ferrite sleeve that has an axial slot therein that extends the entire length of the sleeve so as to form one continuous air gap extending from one end of the sleeve to the other. The filter contact is further characterized by the fact that the inductive portion of the filter assembly does not readily saturate as the current through the contact increases.

In one embodiment of the invention, the electrical filter comprises: a filter element formed of an outer ceramic tubular member 20 and an inner ferrogmagnetic tubular member 10, the ferromagnetic tubular member haivng an axial opening 12 therethrough and at least one slot 11 therein that extends the entire length of the ferromagnetic tubular member so that there is at least one continuous air gap extending from one end of the ferromagnetic tubular member to the other end, the outer ceramic tubular member having at least a portion of its outer surface conductively coated 21 and a portion of its inner surface conductively coated 22, 24, and inner and outer surface coatings being electrically isolated from each other; a terminal pin or contact 1; and means for mounting the filter element around a portion of the terminal pin, e.g., solder 30, the mounting means including means to electrically connect together the conductive coating on the inside of the ceramic tubular member to the terminal pin. In this embodiment of the invention it is preferred that the air gap in the ferromagnetic tubular member be in the order of 0.001 inches.

Accordingly, it is an object of this invention to provide a filter contact assembly for an electrical connector that does not saturate during normal operation to cause an undesirable decrease in the attenuation performance of the filter contact.

It is another object of this invention to provide a ferrite sleeve for a filter contact that does not saturate during normal use.

It is still another object of this invention to provide an improved electrical connector assembly of the type for filtering out undesired high frequency currents.

It is a further object of this invention to increase the effectiveness of a flter contact without increasing or complicating the existing structure.

The above and other objects and features of the invention will become apparent from the following detailed description taken in conjunction with the accompanying drawings and claims which form a part of this specification.

DETAILED DESCRIPTION OF THE DRAWINGS

Figures 1, 2:
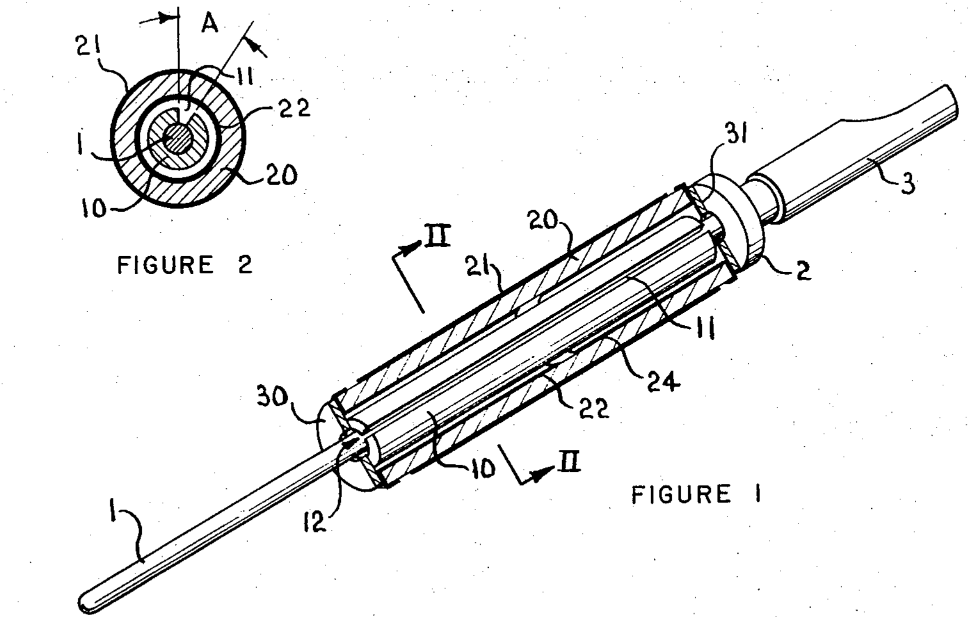
FIG. 1 is a filter contact showing the filter portion in partial cross-section.
FIG. 2 is an axial cross-sectional view of the filter contact shown in FIG. 1 taken along Lines II—II.

Referring now to the drawings, FIG. 1 illustrates a filter contact assembly for an electrical connector. The filter contact assembly comprises: a terminal pin or electrical contact 1; a ferrite sleeve 10; a ceramic sleeve 20; and mounting means 30, such as a friction fit end plate or solder terminal for mounting the ferrite sleeve 10 and ceramic sleeve 20 to the terminal 1.

The electrical contact 1 includes a rear shoulder 2 and a wire receiving portion 3. The shoulder 2 is for locating the ferrite sleeve 10 and ceramic sleeve 20 in their proper positions on the terminal 1.

The ferrite sleeve is a ferromagnetic tubular member that comprises the inductive portion of the filter contact assembly. The ferrite sleeve 10 includes an axial opening 12 and a slot 11 therein that extends the entire length of the ferromagnetic tubular member 10 so that there is at least one continuous air gap extending from one end of the ferromagnetic tubular member to the other end. It is the function of this air gap 11 to prevent the ferrite sleeve 10, which acts as an inductor during operation, from saturating and thereby ceasing to be an effective inductor element which further results in loss of attenuation to undesirable high frequency currents.

The outer ceramic sleeve 20 forms the capacitive portion of the filter circuit. The capacitive characteristics are obtained by a conductive coating 21 on the outer surface interacting electrically with two coatings 22, 24 isolated therefrom and from each other on the inner diameter of the ceramic tube 20.

The sleeves 10 and 20 are mounted on the contact 1 by any suitable method. In this embodiment the sleeves have been soldered to the contact 1 by solder coated preforms 30, 31 which are placed in position on the contact 1 and then heated to lock the assembly in fixed position. The sleeves 10 and 20 may be removably mounted on the contact 1 by suitable means such as an end plate having the same shape as the solder preforms and pressure fit on the contact 1.

FIG. 2 illustrates an axial cross-section of the filter assembly shown in FIG. 1 taken along lines II—II. This view illustrates that the coatings 21, 22 and 24 extend 3600° around the outer and inner diameter respectively of the ceramic tubing 20. For purposes of this invention it is preferred that the gap 11 in the ferrite sleeve 10 be within a preferred range. In standard electrical connectors of the type having multiple filter contacts it is preferred that this gap 11 be in the order of 0.001 inches. However, variations in the diameter of the components affect this gap and therefore it is recommended that the gap 11 be in the range wherein the ferrite sleeve 10 extends less than 360° but more than 350° around its axial passage 12.

Figure 3:
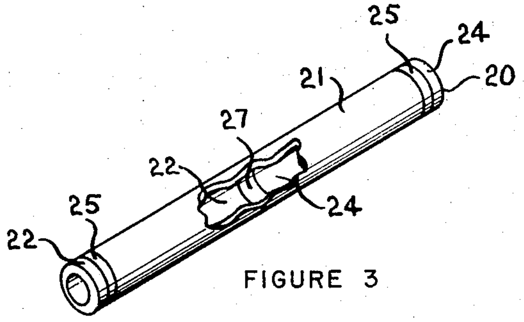
FIG. 3 illustrates the capacitive member of the filter assembly shown in FIG. 1.

FIG. 3 illustrates the details in the capacitor portion of the filter assembly shown in FIG. 1. The capacitor portion of the filter assembly is generally comprised of a dielectric material such as a ceramic tubular member 20 which is comprised of a material such as barium titanate.

To cause the ceramic tube 20 to act as a capacitor, a plurality of conductive coatings 21, 22 and 24 are applied thereto. One example of a suitable conductive coating is a double coating which comprises a plating of nickel covered by a plating of gold. The outer coating 21 on the ceramic sleeve 20 forms a continuous coating around the outer diameter thereof but terminates short of the ends of the tube 20 so there is a non-conductive surface portion 25 at each end that is also continuous around the surface of the ceramic sleeve 20. The inner conductive coatings 22 and 24 form continuous coatings around the inner diameter of the sleeve 20 but are electrically isolated from each other and coating 21. Each of the inner coatings 22 and 24 extends around the ends of the sleeve 20, terminating on the outside surface thereof. Both inner coatings 22 and 24 which extend to the outside surface are electrically isolated from the coating 21 by the absence of a conductive coating around the sleeve at point 25.

Figure 4:
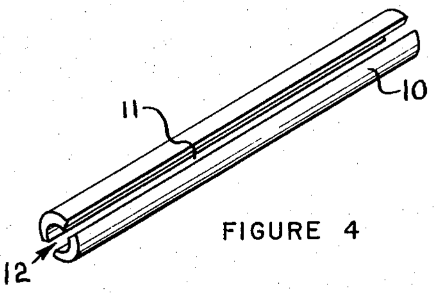
FIG. 4 shows an inductive member of the filter assembly similar to that shown in FIG. 1.

FIG. 4 illustrates an alterante embodiment of the ferrite sleeve 10 in the filter assembly shown in FIG. 1. In this embodiment the ferrite sleeve 10 is comprised of two separate pieces which are placed together on the electrical contact (1, FIG. 1) to form a ferrite sleeve that has an axial passage 12 and two continuous air gaps 11 associated therewith. Each half of the ferrite sleeve 10 may be attached to the electrical contact by any suitable means, i.e., a thermal setting epoxy compound, the air gap being less than 0.005 inches and preferably in the order of 0.001 inches.

Figure 5:
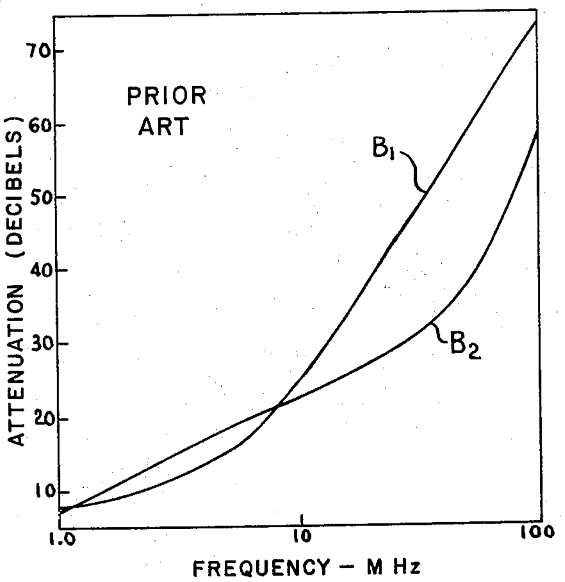
FIG. 5 illustrates the operational characteristics of a prior art filter contact that does not embody the principles of the invention.

FIG. 5 illustrates in graph form the attenuation characteristics of a prior art filter contact that does not utilize the principles of the invention. This proir art graph is illustrated so that the advantages and distinctions of applicant's invention from the prior art may be more readily appreciated. Plotted on the Y coordinate is attenuation in decibels, the attenuation increasing in increments of 10 decibels from the origin. Plotted on the X coordinate is frequency in megahertz. Curve $B_1$ indicates the attenuation characteristics of a filter contact with 0 volts d-c, 0 amps d-c and a high frequency component in the mocrovolts range impressed thereon. Curve $B_2$ illustrates the attenuation characteristics of a prior art filter contact with 0 volts d-c, 7.5 amps d-c and a high frequency component in the microvolts range. The comparison of curve $B_2$ to $B_1$ indicates that when d-c current through the filter contact increases, the attenuation generally derived therefrom drops off sharply above 10 megahertz.

Figure 6:
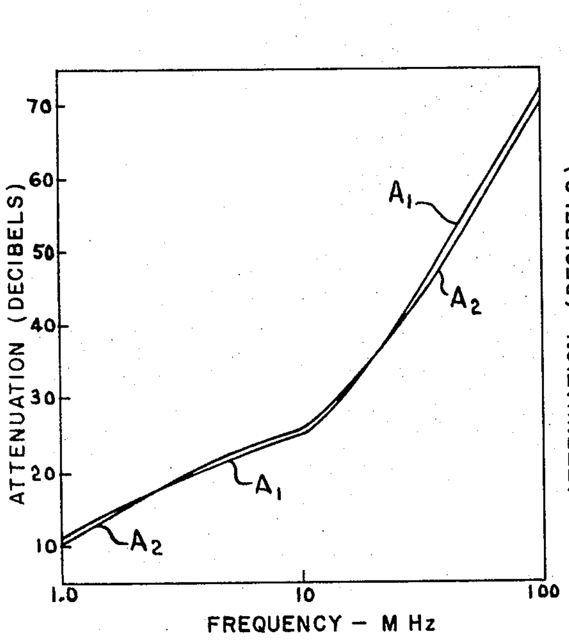
FIG. 6 illustrates the operational characteristics of a filter contact that embodies the principles of this invention.

FIG. 6 illustrates in graph form the attenuation characteristics of a filter contact made in accordance with the principles of this invention. The data for this graph was taken in the same manner as described for that in the graph shown in FIG. 5. Curve $A_1$ illustrates the attenuation characteristics of the filter contact shown in FIG. 1 with 0 volts d-c, 0 amps d-c and a high frequency signal in the microvolt range impressed thereon. Curve $A_2$ indicates the attenuation characteristics of the same filter contact with 0 volts d-c, 7.5 amps d-c and a high frequency signal in the microvolt range. The graph illustrates the fact that for increasing d-c currents through the contact 1 attenuation of the unwanted high frequency currents was not appreciably diminished above 10 megahertz. Therefore, in applications where a high feed through d-c or low frequency a-c current is required and where there is a need to maintain optimum attenuation performance, this type of contact is desired. Obviously the standard filter contact with a solid one-piece ferrite sleeve would not meet this criterion. Data similar to that shown in FIG. 6 was obtained from a filter contact utilizing a ferrite sleeve that was comprised of two pieces, the original ferrite sleeve having been cut in half and then cemented to an electrical contact. The air gap for the filter contact tested for FIG. 6 was about 0.001 inches and is the preferred air gap spacing.

Most of the data obtained relating to the split ferrite inductive element of the filter (FIG. 6) indicates that the performance of the split ferrite type filter contact did not change until a frequency of 15 megahertz was reached and current flowing through the contact exceeded 5 amps d-c. Although there was a change in the attenuation characteristics at 15 megahertz, at 100 megahertz and 7.5 amps d-c the attenuation characteristics returned to approximately the characteristics of those of a contact with 0 amps d-c therethrough. The standard filter, on the other hand (FIG. 5), shows a change in attenuation that is desirable at 5 megahertz and at current levels below 7.5 amps d-c. Both classes of filters seem to be more adversely affected at 50 megahertz than at any other frequency. This is probably caused by magnetic permeability of the particular ferrite material which seems to reach a maximum at 50 megahertz. Obviously the magnetic permeability of the ferrite sleeves is affected by increases in d-c current through the contact 1. The split ferrite will not eliminate the saturation effect completely. However, it does linearize the permeabliity and move the flux density from the realm of saturation during operation, especially above 10 megahertz, so that higher d-c currents are required to produce saturation and adverse operation. As the gap increases, more flux density is required to produce saturation. A contact assembly made according to the description herein avoids saturation of the inductor element (by high current) that will eliminate the inductive effect which removes the inductive portion of the filter that allows high frequency currents to pass therethrough.

While a preferred embodiment of the invention has been disclosed, it will be apparent to those skilled in the art that changes may be made to the invention as set forth in the appended claims and, in some instances, certain featurs of the invention may be used to advantage without corresponding use of other features. For example, it was pointed out that the ferrite sleeve may have one gap or two gaps therein and the object of the invention will still be achieved. Accordingly, it is intended that the illustrative and descriptive materials herein be used to illustrate the principles of the invention and not to limit the scope thereof.

Having described the invention, what is claimed is:

1. In combination with an electrical connector of the type having a plurality of electrical contacts each of which includes means for attenuating signals of predetermined frequencies, the improvement wherein each of said electrical contacts comprises:

an electrically conductive terminal having a mating end, a wire receiving end and a middle portion; a capacitive element; and an inductive element comprising a ferrite sleeve disposed around said middle portion of said terminal, said sleeve having at least one axial opening therethrough and a slot therein that extends th entire length of said sleeve so that there is at least one continuous air gap extending from one end of said sleeve to the other.

2. The electrical connector as recited in claim 1 wherein the wall of said ferrite sleeve extends less than 360° but more than 350° around said axial opening therein.

3. The electrical connector as recited in claim 1 wherein the slot in said ferrite sleeve is less than 0.005 inches wide.

4. The electrical connector as recited in claim 1 including means for mounting said ferrite sleeve to said contact, and wherein the ferrite sleeve disposed around the middle portion of said contact has two slots therein so that there are at least two continuous air gaps extending from one end of said sleeve to the other and said sleeve is comprised of two pieces.

5. The electrical connector as recited in claim 2 including means for mounting said ferrite sleeve to said contact, and wherein the ferrite sleeve disposed around the middle portion of said contact has two slots therein so that there are at least two continuous air gaps extending from one end of said sleeve to the other and said sleeve is comprised of two pieces.

6. The electrical connector as recited in claim 3 including means for mounting said ferrite sleeve to said contact, and wherein the ferrite sleeve disposed around the middle portion of said contact has two slots therein so that there are at least two continuous air gaps extending from one end of said sleeve to the other and said sleeve is comprised of two pieces.

7. An electrical filter assembly comprising:

a filter element formed of an outer ceramic tubular member and an inner ferromagnetic tubular member, said ferromagnetic tubular member having an axial opening therethrough and at least one slot therein that extends the entire length of said ferromagnetic tubular member so that there is at least one continuous air gap extending from one end of said ferromagnetic tubular member to said other end, said outer ceramic tubular member having at least a portion of its outer surface conductively coated and a portion of its inner surface conductively coated, said inner and outer surface coating electrically isolated from each other;

a terminal pin; and means for mounting said filter element around a portion of said terminal pin, said mounting means including means to electrically connect together the conductive coating on the inside of said ceramic tubular member and said terminal pin.

8. The electrical filter assembly recited in claim 7 wherein the slot in said ferrite sleeve is less than 0.005 inches wide.

9. The filter assembly as recited in claim 7 wherein the wall of said ferrite sleeve extends less than 360° but more than 350° around said axial opening therein.

10. An electrical filter assembly comprising:

capacitor means including a tube made of dielectric material and an electrically conductive coating on a portion of the outer surface of said tube adapted to be connected to a suitable electrical ground;

an electrically conductive terminal;

inductor means positioned within said tube and having a central aperture receiving said electrically conductive terminal therein, said inductor means having at least one slot therein that extends adjacent the entire length of said central aperture so that there is at least one continuous air gap extending from one end of said inductor means to the other end of said inductor means; ind means made of electrically conductive material for retaining said inductor means within said tube.

11. An electrical filter assembly as recited in claim 10 wherein said retaining means is spaced from said electrically conductive coating on the outer surface of said dielectric tube.

12. An electrical filter assembly as recited in claim 10 wherein the wall of said inductor means extends less than 360 but more than 350° around said axial slot.

13. An electrical filter assembly as recited in claim 11 wherein the wall of said inductor means extends less than 360 but more than 350° around said axial slot.

* * * * *